(12) United States Patent
Gay

(10) Patent No.: US 7,898,817 B2
(45) Date of Patent: Mar. 1, 2011

(54) CIRCUIT BOARD ASSEMBLY

(75) Inventor: Raphael Gay, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 867 days.

(21) Appl. No.: 11/581,854

(22) Filed: Oct. 17, 2006

(65) Prior Publication Data

US 2008/0091645 A1    Apr. 17, 2008

(51) Int. Cl.
*H05K 7/00* (2006.01)
(52) U.S. Cl. .................. 361/760; 361/720; 361/740
(58) Field of Classification Search ................ 707/2; 361/760, 740, 720
See application file for complete search history.

(56) References Cited

U.S. PATENT DOCUMENTS

| 6,985,904 | B1 * | 1/2006 | Kaluskar et al. ............ 707/101 |
| 2002/0008963 | A1 * | 1/2002 | DiBene et al. .............. 361/720 |
| 2004/0242037 | A1 * | 12/2004 | Hall .......................... 439/135 |
| 2008/0091646 | A1 * | 4/2008 | Al-Omari et al. ............. 707/2 |

* cited by examiner

*Primary Examiner*—Tuan T Dinh
*Assistant Examiner*—Andargie M Aychillhum

(57) ABSTRACT

In one embodiment, a circuit board assembly comprises a first circuit board comprising a first array of alignment holes, a second circuit board comprising a second array of alignment holes, and at least one press pin dimensioned to fit in one or more of the alignment holes.

4 Claims, 5 Drawing Sheets

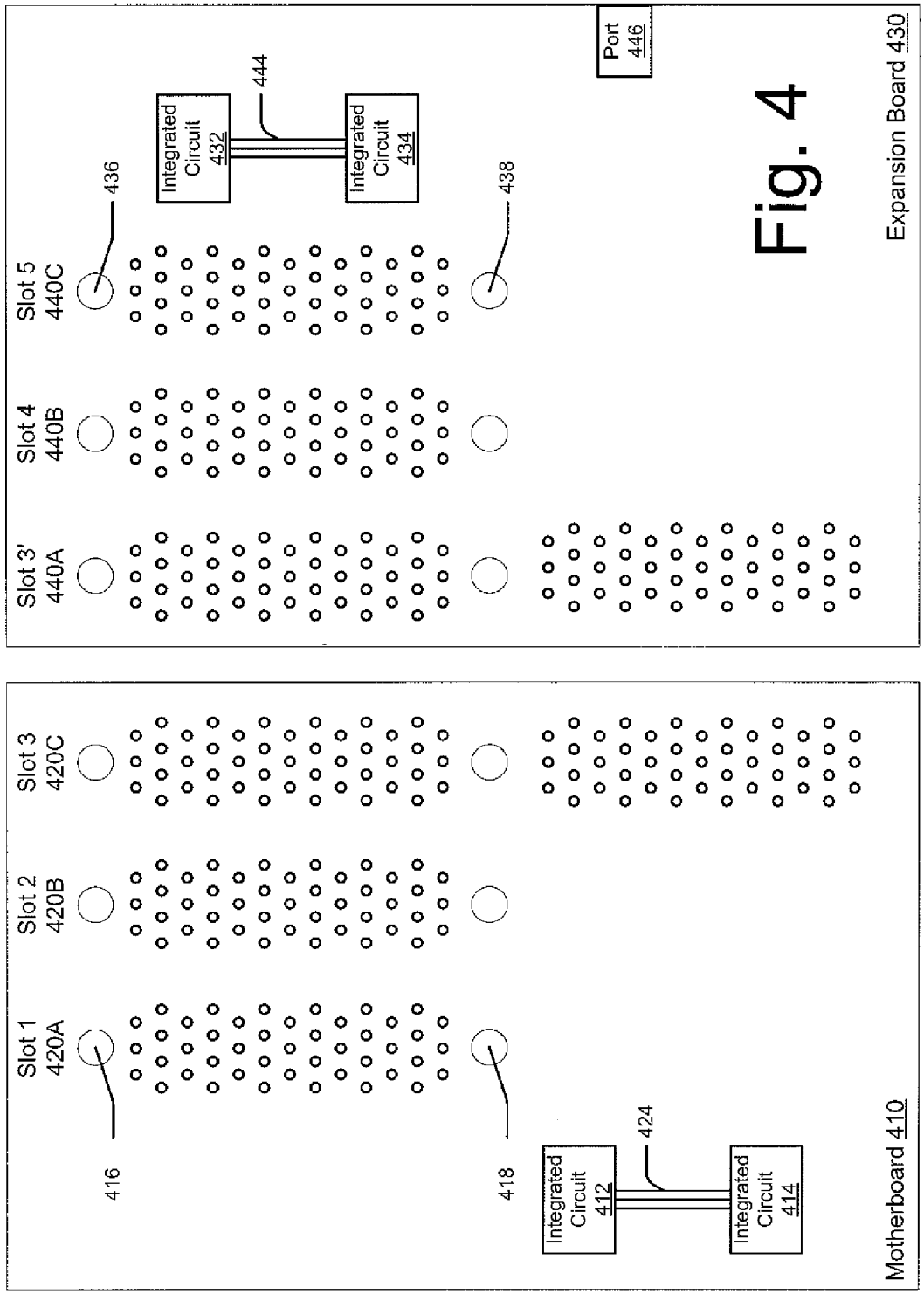

CIRCUIT BOARD ASSEMBLY

BACKGROUND

Many electronic devices such as, e.g., computer systems, include circuit boards onto which components such as, e.g., integrated circuits are mounted. Most computer systems include a main circuit board, frequently referred to as a motherboard, to which additional circuit boards and/or cards may be coupled.

Varying consumer preferences motivate computer manufacturers to design and manufacture computer systems having a wide variety of physical form factors. For example, computer systems may be offered in full-sized or reduced-size housings. In addition, motherboard configurations may vary based on the components included in the computing system.

Designing a motherboard for each computer system model and/or configuration consumes a material amount of resources. Hence, the ability to leverage motherboard designs across multiple computer system models and configurations increases the efficiency of operations for computer system designers and manufacturers.

BRIEF DESCRIPTION OF THE DRAWINGS

FIG. 4 is a top-view of a circuit board assembly according to an embodiment.

DETAILED DESCRIPTION

Figure 1:
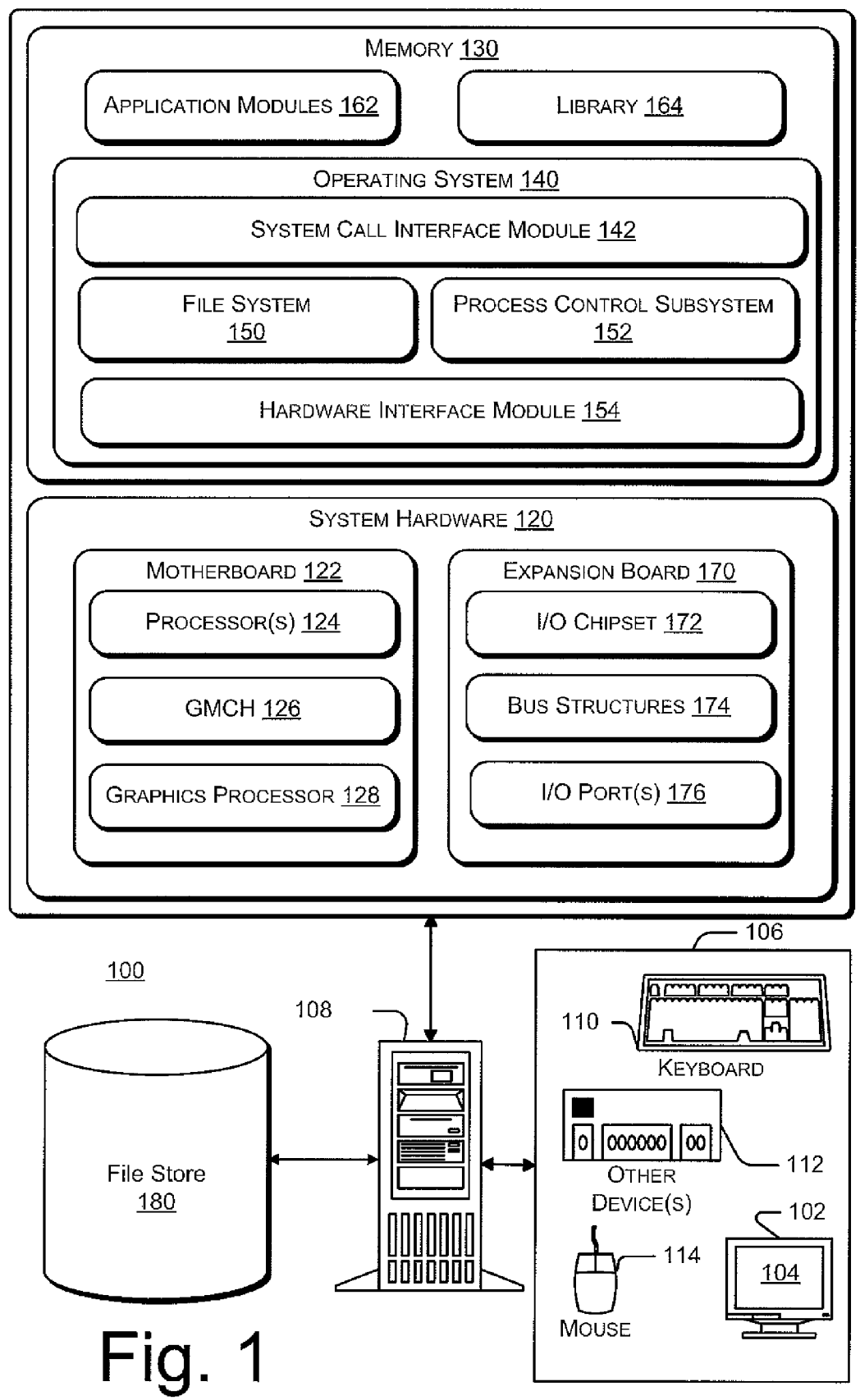
FIG. 1 is a schematic illustration of a computing system, according to embodiments.

FIG. 1 is a schematic illustration of an exemplary computer system 100. The computer system 100 comprises a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that enables the system 100 to receive input from a developer and/or a user. The computer 108 comprises system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

In some embodiments, system hardware 120 comprises a motherboard 122 and one or more expansion boards 170. Motherboard 122 hosts a plurality of components comprising at least one processor 124, a graphics and memory control hub (GMCH) 126, and a graphics processor. Motherboard 122 further comprises sockets to receive the various components mounted on motherboard 122 and circuit traces to provide electrical connections between the components.

In some embodiments, expansion board 170 may be an input/output (I/O) board. Expansion board 170 may include an I/O chipset such as, for example, a PCI-Express (PCIE) chipset 172, and bus structures 174 and one or more I/O ports 176. In some embodiments expansion board may include components which provide different functionality.

Memory 130 comprises an operating system 140 for managing operations of computer 108. Operating system 140 comprises a hardware interface module 154 that provides an interface to system hardware 120. At least one or more file systems 150 to manage files used in the operation of computer 108, and a process control subsystem 152 that manages processes executing on computer 108. Operating system 140 further comprises a system call interface module 142 that provides an interface between the operating system 140 and one or more 162 and/or libraries 164.

In operation, at least one application module 162 and/or library 164 executing on computer 108 make calls to the system call interface module 142 to execute one or more commands on the computer's processor. The system call interface module 142 invokes the services of the file systems 150 to manage the files required by the command(s) and the process control subsystem 152 to manage the process required by the command(s). The file system 150 and the process control subsystem 152, in turn, invoke the services of the hardware interface module 154 to interface with the system hardware 120.

Figure 2A:
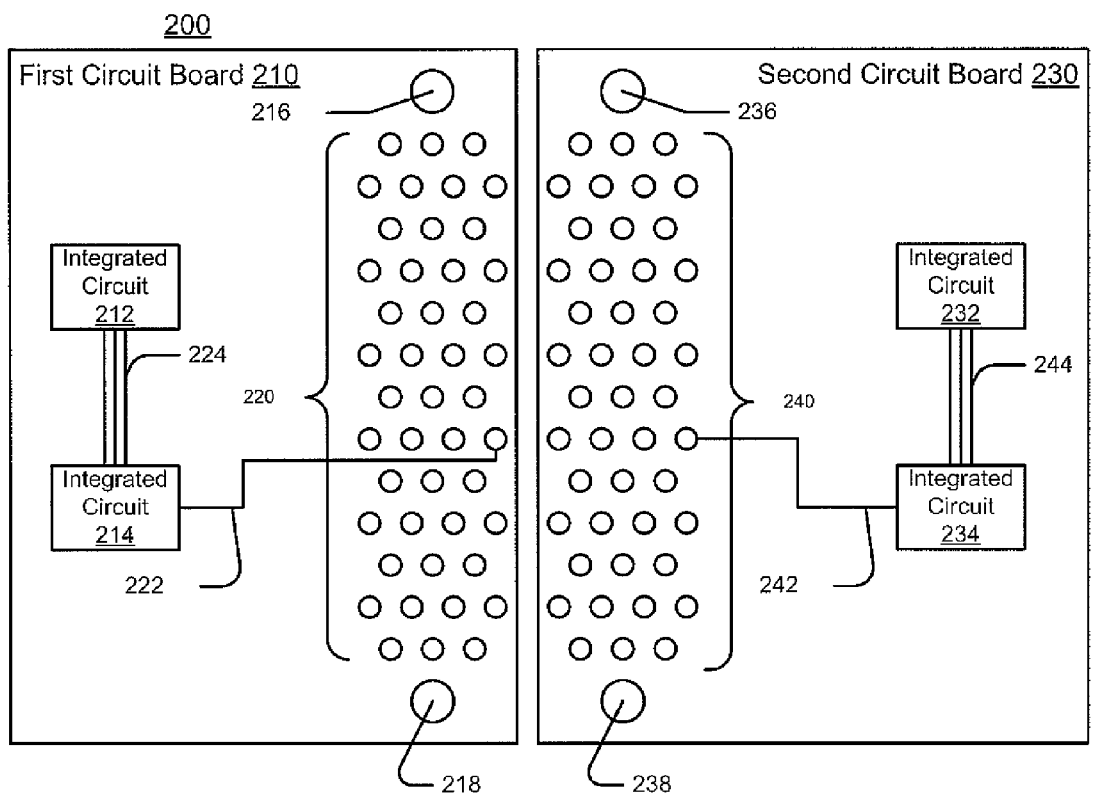
FIG. 2A is a top-view of a circuit board assembly according to an embodiment.
Figure 2B:
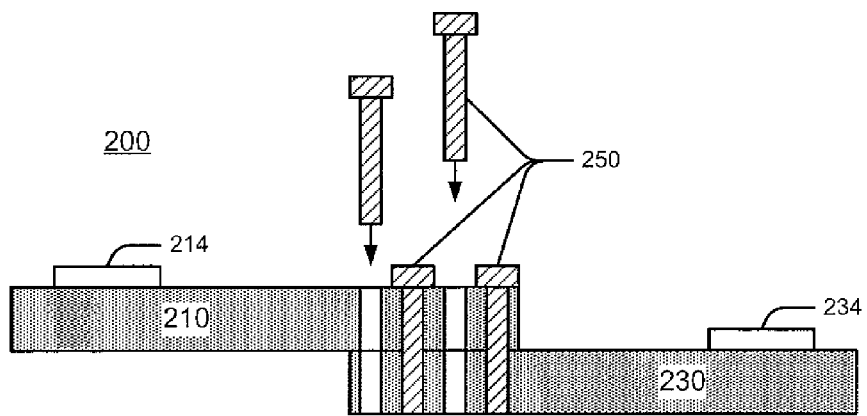
FIG. 2B is a cross-sectional, side view of a circuit board assembly according to an embodiment.

The computing system 100 comprises at least one or more circuit board assembly. FIG. 2A is a top-view of a circuit board assembly 200 according to some embodiments, and FIG. 2B is a cross-sectional, side view of the circuit board assembly 200, according to an embodiment. Referring to FIGS. 2A-2B, circuit board assembly 200 comprises a first circuit board 210 and a second circuit board 230. In some embodiments, the first circuit board 210 is a motherboard in an electronic device such as, e.g., a computer 108, and second circuit board 230 is an expansion board.

In FIG. 2A, first circuit board 210 may include one or more integrated circuits 212, 214 coupled by a communication link 224. Similarly, second circuit board 230 may include one or more integrated circuits 232, 234 coupled by a communication link 244. For example, integrated circuits 212, 214, 232, 234 may include a processor, memory controller, graphics controller, a memory module(s), or the like. Communication links 224, 244 may be implemented as a simple point-to-point communication link such as, e.g., a serial or parallel link. Alternately, communication link 224 may be implemented as a communication bus such as, e.g., a PCI bus, a PCI Express bus, or the like.

In some embodiments, first circuit board 210 comprises a first array of alignment holes 220 which extend through circuit board 210. Similarly, second circuit board 230 comprises a second array of alignment holes 240 which extend through circuit board 230. In addition, first circuit board 210 may comprise one or more holes 216, 218 for a mechanical stand-off or bolts to secure the circuit board 210 to 230 or to a chassis or other portion of a housing. Similarly, second circuit board 230 may comprise one or more holes 236, 238 for a mechanical stand-off or bolts to secure the circuit board 230 to 210 or to a chassis or other portion of a housing. Circuit boards 210, 230 may include additional components such as, e.g., traces, vias, transisitors, and the like. These components are omitted in FIGS. 2A and 2B for clarity.

Referring now to FIG. 2B, circuit boards 210 and 230 are connected to form an integrated circuit board assembly 200. In some embodiments, circuit board 230 is positioned below circuit board 210 such that the first array of alignment holes 220 is positioned above the second array of alignment holes 240. One or more press pins 250 are inserted into the alignment holes 220, 240 to connect the circuit boards 210, 230 into an integrated assembly 200.

Press pins 250 are dimensioned to fit snugly into alignment holes 220, 240. In the embodiment depicted in FIG. 2B, press pins 250 are dimensioned such that the body of press pins 250 extend substantially through circuit boards 210, 230. In alternate embodiments, the body of press pins 250 may extend partially through circuit boards 210, 230, or may extend in length beyond the combined thickness of circuit boards 210, 230. The press pins 250 that extend through the alignment holes 220, 240 may be made from or coated with an electrically conductive material such as, e.g., copper, aluminum, steel, or the like, such that the press pin 250 establishes an electrical connection between the first circuit trace 222 and the second circuit trace 242.

In some embodiments the alignment holes 220, 240 and press pins 250 (FIG. 2B) may be used to provide one or more electrical connections between first circuit board 210 and second circuit board 230. Thus, in some embodiments the first circuit board 210 comprises a circuit trace 222 coupled to an alignment hole 220. Similarly, the second circuit board comprises a circuit trace 242 coupled to an alignment hole 240. For clarity, the circuit board assembly 200 illustrates only a single circuit trace on each board. In practice, each board may include a plurality of traces coupled to the respective alignment holes 220, 240 on the boards.

While the embodiment depicted in FIG. 2B illustrates the second circuit board 230 beneath the first circuit board 210, in alternate embodiments the second circuit board 230 may be above the first circuit board 210. Also, while the embodiment depicted in FIG. 2A illustrates the first circuit board 210 directly adjacent the second circuit board 230, it will be appreciated that the first circuit board 210 and the second circuit board 230 may be offset along their respective lengths once connected.

Figure 3A:
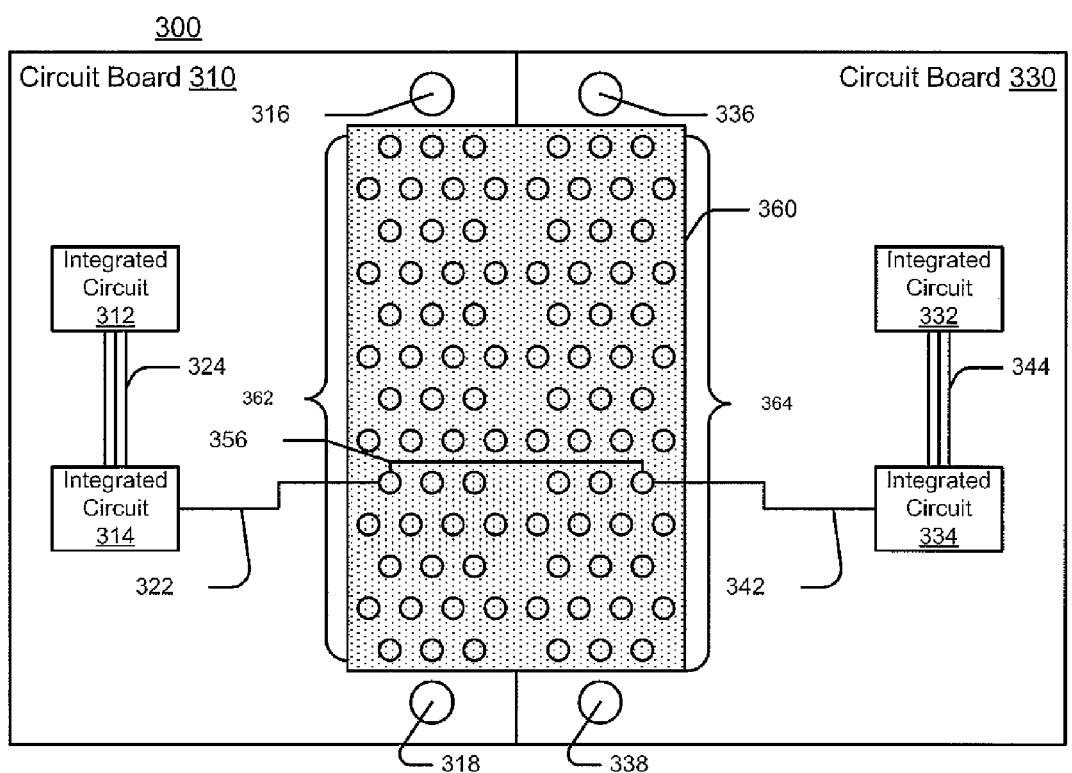
FIG. 3A is a top-view of a circuit board assembly according to an embodiment.

The embodiment depicted in FIGS. 2A-2B result in the circuit boards 210, 230 being disposed in two different planes when connected into circuit board assembly 200. In some circumstances it is advantageous for circuit boards 210, 230 to remain in a single plan when connected into a circuit board assembly. FIG. 3A is a top-view of a circuit board assembly according to such an embodiment, and FIGS. 3B-3C are cross-sectional, side view of circuit board assemblies according to such embodiments.

Figure 3B:
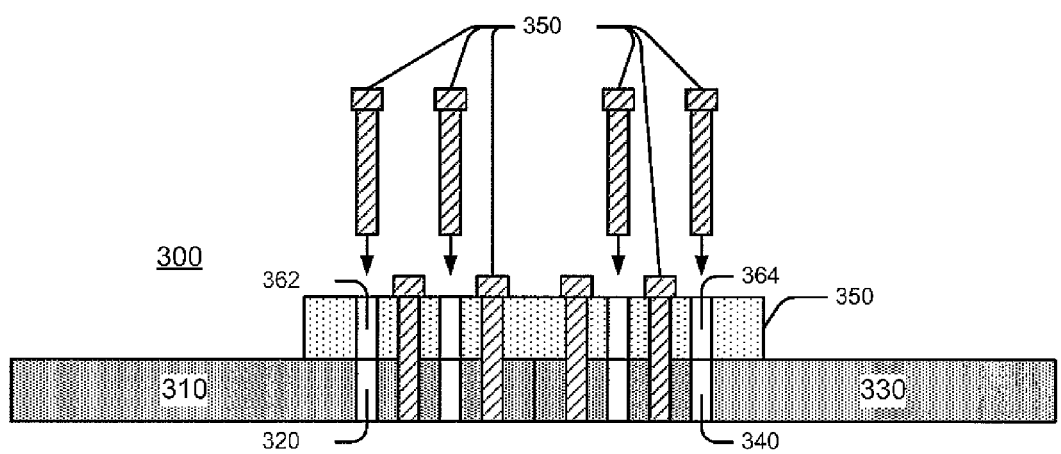
FIGS. 3B-3C are cross-sectional, side view of circuit board assemblies according to embodiments.
Figure 3C:
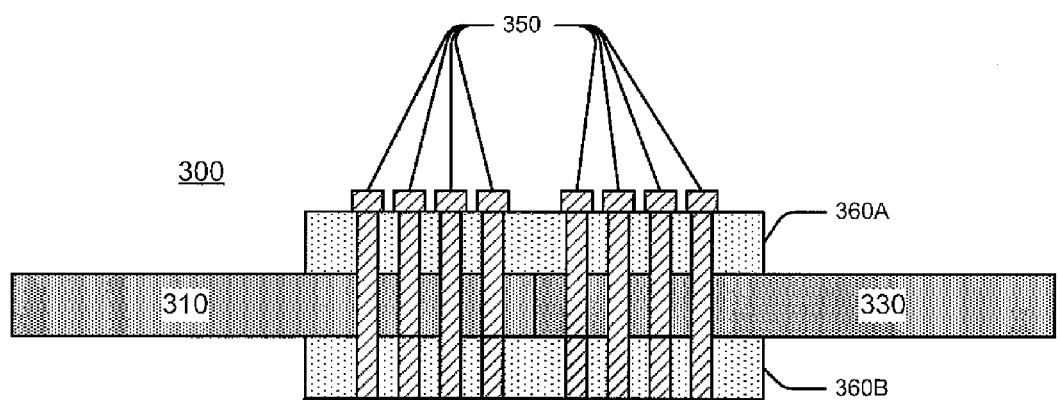

Referring to FIGS. 3A-3C, circuit board assembly 300 comprises a first circuit board 310 and a second circuit board 330. In some embodiments, the first circuit board 310 is a motherboard in an electronic device such as, e.g., a computer 108 and second circuit board 330 may be an expansion board.

In FIG. 3A, first circuit board 310 comprises one or more integrated circuits 312, 314 coupled by a communication link 324. Similarly, second circuit board 330 comprises one or more integrated circuits 332, 334 coupled by a communication link 344. For example, integrated circuits 312, 314, 332, 334 may include a processor, memory controller, graphics controller, a memory module(s), or the like. Communication links 324, 344 may be implemented as a simple point-to-point communication link such as, e.g., a serial or parallel link. Alternately, communication link 324 may be implemented as a communication bus such as, e.g., a PCI bus, a PCI Express bus, or the like.

In some embodiments, first circuit board 310 comprises a first array of alignment holes 320 which extend through circuit board 310. Similarly, second circuit board 330 comprises a second array of alignment holes 340 which extend through circuit board 330. Alignment holes 320, 340 are substantially the same as alignment holes 220, 240 depicted in FIG. 2A.

In addition, first circuit board 310 comprises one or more holes 316, 318 for a mechanical stand-off or bolts to secure the circuit board 310 to 330 or to a chassis or other portion of a housing. Similarly, second circuit board 330 comprises one or more holes 336, 338 for a mechanical stand-off or bolts to secure the circuit board 330 to 310 or to a chassis or other portion of a housing. Circuit boards 310, 330 may include additional components such as, e.g., traces, vias, transitsitors, and the like. These components are omitted in FIGS. 3A, 3B, and 3C for clarity.

In the embodiment depicted in FIG. 3A, a bridge plate 360 is positioned above circuit boards 310, 330. In some embodiments, bridge plate 360 comprises an array of alignment holes 362 that correspond to the alignment holes 320 on first circuit board 310 and an array of alignment holes 364 that correspond to the alignment holes 340 on second circuit board 330.

Referring now to FIG. 3B, bridge plate 360 may be used to connect circuit boards 310 and 330 to form an integrated circuit board assembly 300. In some embodiments, bridge plate 360 is positioned above circuit boards 310, 330 such that a plurality of alignment holes 362 in bridge plate 360 align with alignment holes 320 in first circuit board 310 and a plurality of alignment holes 364 in bridge plate 360 align with alignment holes 340 in second circuit board 330. A plurality of press pins 360 are inserted into the alignment holes 362, 320, 364, 340 to connect the circuit boards 310, 330 to the bridge plate 360, thereby forming an integrated assembly 300.

Press pins 350 may be dimensioned to fit snugly into alignment holes 362, 320, 364, 340. In the embodiment depicted in FIG. 3B, press pins 350 are dimensioned such that the body of press pins 350 extend substantially through bridge plate 360 and circuit boards 310, 330, respectively. In alternate embodiments, the body of press pins 350 may extend partially through bridge plate 360 and circuit boards 310, 330, or may extend in length beyond the combined thickness of bridge plate 360 and circuit boards 310, 330.

Referring to FIG. 3C, two bridge plates 360A and 360B are used. For example, a first bridge plate 360A may be disposed above circuit boards 310, 330 and a second bridge plate 360B may be disposed beneath circuit boards 310, 330. In the embodiments depicted in FIG. 3C, press pins are dimensioned such that the body of press pins 350 extend substantially through bridge plates 360A, 360B and circuit boards 310, 330, respectively. In alternate embodiments, the body of press pins 350 may extend partially through bridge plates 360A, 360B and circuit boards 310, 330, or may extend in length beyond the combined thickness of bridge plates 360A, 360B and circuit boards 310, 330. The press pin 350 that extends through the alignment holes 362, 320, 364, 340 may be made from or coated with an electrically conductive material such as, e.g., copper, aluminum, steel, or the like, or combinations thereof such that the press pin 350 establishes an electrical connection between the first circuit trace 322 and the second circuit trace 342.

In some embodiments the alignment holes 362, 320, 364, 340 and press pins 350 (FIGS. 3B & 3C) may be used to provide one or more electrical connections between first circuit board 310 and second circuit board 330. Thus, in some embodiments the first circuit board 310 comprises a circuit trace 322 coupled to an alignment hole 320. Similarly, the second circuit board 330 comprises a circuit trace 342 coupled to an alignment hole 340. Similarly, bridge plate 360 comprises a circuit trace 356 coupled between one or more alignment holes 362, 364. For clarity, the circuit board assembly 300 illustrates only a single circuit trace on each board. In practice, each board may include a plurality of traces coupled to the respective alignment holes 320, 340.

In some circumstances it may be advantageous to provide an adjustable circuit board assembly. FIG. 4 is a top-view of a circuit board assembly 400 according to such embodiments. Referring to FIG. 4, motherboard 410 comprises one or more integrated circuits 412, 414 coupled by a communication link 424. Similarly, expansion board 430 comprises one or more integrated circuits 432, 434 coupled by a communication link 444. For example, integrated circuits 412, 414, 432, 434 may comprise a processor, memory controller, graphics controller, a memory module(s), or the like. Expansion board 430 may further include one or more input/output (I/O) ports 446.

Communication links 424, 444 may be implemented as a simple point-to-point communication link such as, e.g., a serial or parallel link. Alternately, communication link 424 may be implemented as a communication bus such as, e.g., a PCI bus, a PCI Express bus, or the like.

In some embodiments, motherboard 410 comprises a plurality of arrays of alignment holes, referred to in FIG. 4 as slot 1 (420A), slot 2 (420B), and slot 3 (420C), which extend through motherboard 410. Similarly, expansion board 430 comprises a plurality of arrays of alignment holes referred to in the drawings as slot 3' (440A), slot 4 (440B), and slot 5 (440C) which extend through expansion board 430. Alignment holes 420, 440 may be substantially the same as alignment holes 220, 240 depicted in FIG. 2A.

As was described with reference to the circuits boards of FIGS. 2A and 3A, motherboard 410 may comprise one or more holes 416, 418 for a mechanical stand-off or bolts to secure the motherboard 410 to 430 or to a chassis or other portion of a housing. Similarly, expansion board 430 may comprise one or more holes 436, 438 for a mechanical stand-off or bolts to secure the expansion board 430 to 410 or to a chassis or other portion of a housing. Circuit boards 410, 430 may include additional components such as, e.g., traces, vias, transistors, and the like. These components are omitted in FIG. 4 for clarity.

Expansion board 430 may be connected to motherboard 410, either directly as described with reference to FIGS. 2A-2B or using one or more bridge plates as described with reference to FIGS. 3A-3C. Providing multiple arrays of alignment holes 420A, 420B, 420C, 440A, 440B, 440C on the circuit boards permits the boards to be connected in multiple configurations. For example, in one embodiment the alignment holes 420C may be connected to the alignment holes 440A. In another embodiment, the alignment holes 420A may be connected to the alignment holes 440A to provide a circuit board assembly having a smaller footprint.

As described with reference to FIGS. 2A-2B, the motherboard 410 and expansion board 430 may comprise electrical connections to the alignment holes to permit the alignment holes and connector pins to establish electrical connections between circuitry on the motherboard 410 and the expansion board 430.

Reference in the specification to "one embodiment" or "an embodiment" means that a particular feature, structure, or characteristic described in connection with the embodiment is included in at least an implementation.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A circuit board assembly comprising;
a first circuit board comprising
 a first array of alignment holes;
 a first circuit trace coupled to an alignment hole of the first array of alignment holes;
a second circuit board comprising:
 a second array of alignment holes;
 a second circuit trace coupled to an alignment hole of the second array of alignment holes;
a first bridge plate comprising:
 a third array of alignment holes and a fourth array of alignment holes;
 a third circuit trace coupled to an alignment hole of the third array and coupled to an alignment hole of the fourth array; and
 wherein the first bridge connects the first circuit board to the second circuit board; and at least one press pin dimensioned to fit in one or more of the alignment holes,
 wherein the at least press pin establishes an electrical connection between the first circuit trace and the second circuit trace via the third circuit trace.

2. A circuit board assembly comprising:
first circuit board means comprising a first array of alignment holes;
first circuit trace means on the first circuit board means coupled to an alignment hole; and
second circuit board means comprising a second array of alignment holes, at least some of first array of alignment holes aligned with at least some of the second array of alignment holes;
second circuit trace means on the second circuit board means coupled to an alignment hole; and
means for connecting the first circuit board means to the second circuit board means, and wherein the means for connecting also for establishing an electrical communication link between the first circuit trace means on the first circuit board means and the second circuit trace means on the second circuit board means;
wherein the means for connection further comprises a first bridge plate having a third array of alignment holes and a fourth array of alignment holes, and at least one press pin to connect the first bridge plate to the first circuit board means and the second circuit board means.

3. A computer system, comprising;
a mother board comprising;
 one or more integrated circuits and a first array of alignment holes; and
 a first circuit trace coupled to an alignment hole;
an expansion board comprising:
 one or more components and a second array of alignment holes; and
 a second circuit trace coupled to an alignment hole;
a first bridge plate having a third array of alignment holes and a fourth array of alignment holes, wherein the first bridge plate connects the motherboard to the expansion board;
wherein the motherboard and the expansion board are connected by a plurality of press pins dimensioned to fit a plurality of the alignment holes; and wherein
the press pin establishes an electrical between the first circuit trace and the second circuit trace.

4. The computer system of claim 3, wherein:
the first bridge plate comprises a third circuit trace coupled to two alignment holes; and
wherein the press pin establishes the electrical communication link between the first circuit trace and the second circuit trace via the third circuit trace.

\* \* \* \* \*

UNITED STATES PATENT AND TRADEMARK OFFICE
CERTIFICATE OF CORRECTION

| | | |
|---|---|---|
| PATENT NO. | : 7,898,817 B2 | Page 1 of 1 |
| APPLICATION NO. | : 11/581854 | |
| DATED | : March 1, 2011 | |
| INVENTOR(S) | : Raphael Gay | |

It is certified that error appears in the above-identified patent and that said Letters Patent is hereby corrected as shown below:

In column 5, line 52, in Claim 1, delete "comprising;" and insert -- comprising: --, therefor.

In column 6, line 7, in Claim 1, delete "bridge" and insert -- bridge plate --, therefor.

In column 6, line 36, in Claim 3, delete "comprising;" and insert -- comprising: --, therefor.

In column 6, line 37, in Claim 3, delete "mother board" and insert -- motherboard --, therefor.

In column 6, line 52, in Claim 3, delete "electrical" and insert -- electrical communication link --, therefor.

Signed and Sealed this
Twenty-seventh Day of September, 2011

David J. Kappos
*Director of the United States Patent and Trademark Office*